No. 701,391. Patented June 3, 1902.
W. PRUSZKOWSKI.
ROTARY BORING APPARATUS.
(Application filed June 12, 1900.)
(No Model.) 2 Sheets—Sheet 1.

Witnesses:

Inventor,
Wladyslaw Pruszkowski.

No. 701,391. Patented June 3, 1902.
W. PRUSZKOWSKI.
ROTARY BORING APPARATUS.
(Application filed June 12, 1900.)
(No Model.) 2 Sheets—Sheet 2.
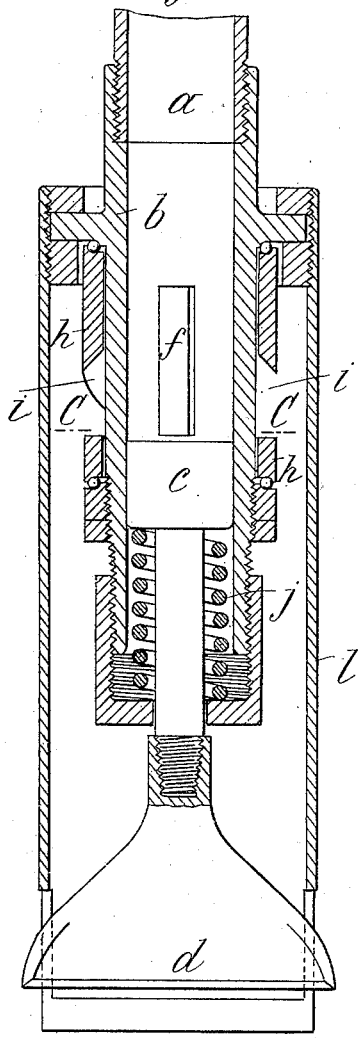
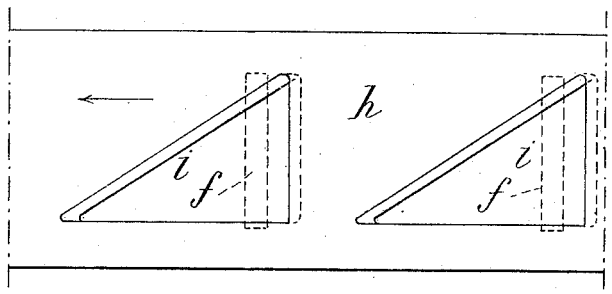
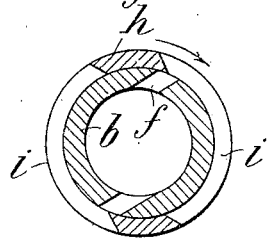
Inventor,
Wladyslaw Pruszkowski

UNITED STATES PATENT OFFICE.

WLADYSLAW PRUSZKOWSKI, OF SCHODNICA, AUSTRIA-HUNGARY.

ROTARY BORING APPARATUS.

SPECIFICATION forming part of Letters Patent No. 701,391, dated June 3, 1902.

Application filed June 12, 1900. Serial No. 20,024. (No model.)

*To all whom it may concern:*

Be it known that I, WLADYSLAW PRUSZ-KOWSKI, a subject of the Emperor of Austria-Hungary, residing at Schodnica, in the Province of Galicia, in the Empire of Austria-Hungary, have invented certain new and useful Improvements in Rotary Boring Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the present invention is a rotatory wash-out boring apparatus, particularly for deep boring, in which apparatus the power of the wash-out water is used to impart a reciprocating up-and-down motion to the boring-tool or cutter during its rotation. For this purpose the boring-tool is affixed to a piston which is moved in a cylinder fitted to the lower end of the tube and which is pressed downward by the wash-out water against the action of a spring. A distributing device actuated by the pressure of the water opens and closes in quick succession, the openings permitting the outflow of the wash-out water from the boring-tube or from the cylinder, whereby the boring-tool is moved alternately downward by the pressure of the water acting on the piston and upward again by the action of the spring.

Figure 1:
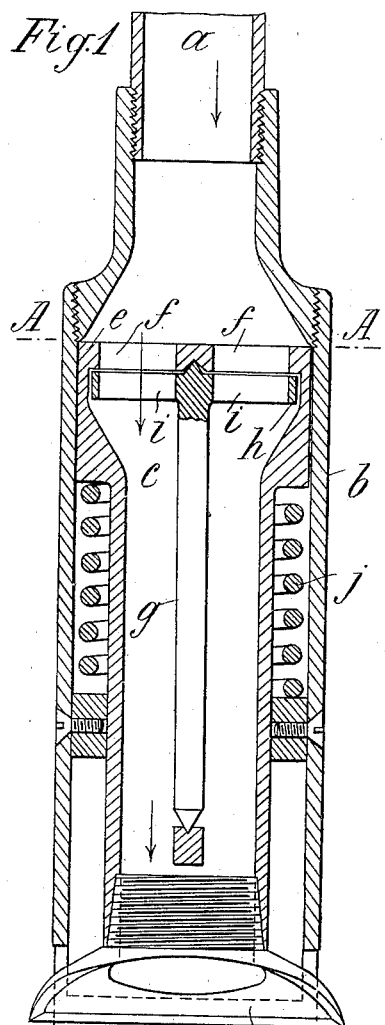
Figure 2:
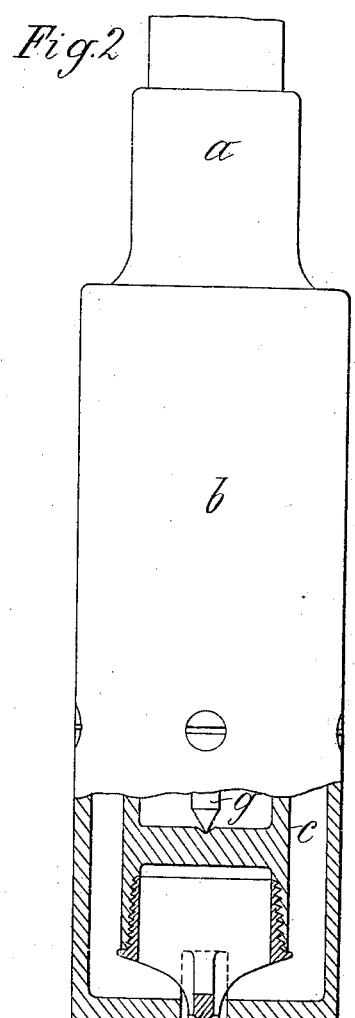
Figure 3:
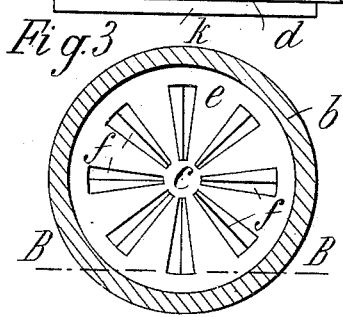
Figure 4:
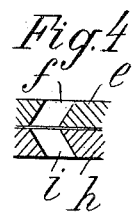

The annexed drawings show, in Figure 1, a vertical section of the boring apparatus. Fig. 2 is a lateral elevation of the same, partly in section. Fig. 3 shows a horizontal section after the line A A, Fig. 1; and Fig. 4 shows a detail of the distributing device in section after the line B B, Fig. 3. A modified arrangement of the apparatus is shown in Fig. 5 in vertical section, while Fig. 6 shows the distributing slide-valve in an unrolled view, and Fig. 7 a horizontal section on the line C C in Fig. 5.

The tubular bore-rods $a$ pass into the cylinder $b$, in which moves the piston $c$. This piston has the form of a tube, to the bottom end of which is firmly screwed the boring-tool or cutter $d$, is widened above, and closed at the top by a cover $e$. The latter is provided with radial slits, whose side walls are inclined toward the vertical line, Figs. 3 and 4. In the hollow of the piston $c$ is arranged a disk $h$, rotating around a vertical spindle $g$ and provided with radial slits $i$, which with regard to their shape and number correspond to the slits $f$ in the cover $e$, but have inversely-inclined side walls, Fig. 4. The disk $h$ is therefore put in rotation by the wash-out water passing through the slits $f$ and $i$ and flowing to the bottom of the bore-hole, the valve for the admission of water being alternately opened and closed in quick succession. As the water has a considerable speed, with every closing of the admission-channels an impact is exercised by the water, whereby the piston $c$, together with the boring-tool $d$, is thrust with considerable force toward the bottom of the bore-hole, overcoming the action of the spring $j$, arranged in the cylinder $b$. In the next moment the channels $i$ get under the channels $f$. The water can freely flow through the same, and therefore exercises no pressure on the piston $c$, which is then raised again by the spring $j$. In this manner the pressure of the wash-out water is utilized to actuate the boring-tool in such a manner that it gives a very great number of blows of relatively great strength against the bottom of the bore-hole.

The boring-tool during its reciprocating up-and-down motion is guided in the transverse slit $k$ of the bottom of the cylinder $b$. The whole apparatus is rotated by means of the boring-rods around its vertical axis and by the action of its own weight gradually descends in the same measure as the cutter $d$ excavates the bottom of the bore-hole. In the case of borings of greater depth the weight of the boring-tubes is partially counterbalanced.

The modified arrangement of the boring apparatus shown in Figs. 5, 6, and 7 offers in comparison with that already described the advantage that the distributing device does not participate in the movement of the piston $c$, and therefore does not suffer from the resulting concussion. The channels $f$ are arranged in the side walls of the cylinder $b$, while the rotating part of the distributing device is formed by a tubular piece $h$, running on balls and surrounding the cylinder $b$, said tubular piece $h$ being provided with two triangular recesses $i$, Fig. 6. Through this arrangement it is achieved that the cross-section of the opening of the outflow gradually increases from naught up to a certain maximum and then is suddenly closed in the moment when the water-jet has reached its greatest speed. In this manner exceedingly strong blows of water are attained, which are transferred upon the piston $c$ and upon the cutter $d$, connected with the same. The casing $l$, which conducts the water to the bottom of the bore-hole, has a slit bottom with which it rests on the bottom of the bore-hole.

I claim—

1. The combination with a tubular bore-rod and a cylinder on the end thereof; of a tool-carrier in said cylinder provided with ports, and a tool on the end of the carrier, and a rotatable valve coöperating with the ports in the carrier to alternately cut off and admit the supply of water through the carrier and cause the inertia of the moving column to drive it and the tool, substantially as set forth.

2. The combination with a tubular bore-rod and a cylinder on the end thereof; of a hollow piston in the cylinder and provided with ports inclined to the direction of flow of water through it, a rotatable valve provided with ports inclined in a direction opposite to those in the piston and located within the piston whereby the current of water is automatically cut off to cause the inertia of the moving column to drive the piston and tool, and a spring to return the piston into operative position, substantially as set forth.

3. The combination with a tubular bore-rod and a cylinder on the end thereof; of a hollow piston in the cylinder and provided with ports in its end inclined in the direction of flow of water, a disk valve pivoted within the piston and provided with radial ports inclined to the direction of flow of water and oppositely to those in the piston, and a coil-spring to return the piston to operative position, substantially as and for the purpose set forth.

4. The combination with a tubular bore-rod and a tubular tool-carrier, open at its lower end and fitted to reciprocate in the lower end of said rod, said carrier provided with a series of ports in communication with the bore-rod above the carrier; of a valve having corresponding ports and controlling said carrier-ports, said valve organized to revolve under the action of the fluid under pressure in the bore-rod whereby the pressure on the carrier is alternately reduced and reëstablished, and means acting to move the carrier against the reduced pressure, for the purpose set forth.

5. The combination with a revoluble tubular bore-rod and a tubular tool-carrier open at its lower end, and fitted to revolve with and to reciprocate in the lower end of said rod, said carrier provided with a series of ports in communication with the bore-rod above the carrier; of a valve having corresponding ports and controlling said carrier-ports, said valve organized to revolve under the action of a fluid under pressure in the bore-rod whereby the pressure on the carrier is alternately reduced and reëstablished, and means acting to move the carrier against the reduced pressure, for the purpose set forth.

6. The combination with a bore-rod having a fluid-passage extending therethrough, a piston-cylinder at the lower end of said rod and in communication with its fluid-passage, said cylinder having fluid-exhaust ports, and a piston working in said cylinder and carrying the boring-tool; of a valve having corresponding ports, and controlling the exhaust-ports in the cylinder, said valve organized to revolve under the pressure acting on the piston-carrier, whereby said pressure is alternately reduced and reëstablished, and means acting to move the piston against the reduced pressure, for the purpose set forth.

7. The combination with a revoluble bore-rod and a tool-carrier fitted to reciprocate in the lower end of said rod, said carrier organized to move in one direction under the action of the inertia of a moving column of fluid; of means for alternately and automatically reducing and reëstablishing the pressure acting on the carrier, and means for moving said carrier in an opposite direction at each reduction, and a casing secured to the bore-rod open at its lower end and provided at said end with oppositely-arranged slots through which the boring-tool projects to cause the same to revolve with the bore-rod without interfering with the reciprocations of said tool, substantially as and for the purpose set forth.

In testimony that I claim the foregoing as my invention I have signed my name in presence of two subscribing witnesses.

WLADYSLAW PRUSZKOWSKI.

Witnesses:
JOSEF RÜBARCH,
ALVESTO S. HOGUE.